US012735025B2

(12) United States Patent
Sarihan et al.

(10) Patent No.: US 12,735,025 B2
(45) Date of Patent: Sep. 15, 2026

(54) METHOD AND VEHICLE GUIDANCE SYSTEM FOR PARKING A VEHICLE IN A TRANSVERSE PARKING SPACE

(71) Applicant: Bayerische Motoren Werke Aktiengesellschaft, Munich (DE)

(72) Inventors: Izden Sarihan, Munich (DE); Anton Uhlig, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 93 days.

(21) Appl. No.: 18/837,627

(22) PCT Filed: Feb. 17, 2023

(86) PCT No.: PCT/EP2023/054073

§ 371 (c)(1), (2) Date: Aug. 12, 2024

(87) PCT Pub. No.: WO2023/161155

PCT Pub. Date: Aug. 31, 2023

(65) Prior Publication Data

US 2025/0136092 A1 May 1, 2025

(30) Foreign Application Priority Data

Feb. 24, 2022 (DE) ..................... 10 2022 104 437.8

(51) Int. Cl.
*B60W 30/06* (2006.01)
*B60W 50/14* (2020.01)

(52) U.S. Cl.
CPC ............ *B60W 30/06* (2013.01); *B60W 50/14* (2013.01); *B60W 2554/80* (2020.02)

(58) Field of Classification Search
CPC .. B60W 30/06; B60W 50/14; B60W 2554/80; B62D 15/0285

(Continued)

(56) References Cited

U.S. PATENT DOCUMENTS 10,025,317 B2 * 7/2018 Batur .................. G05D 1/0246
10,494,024 B2 * 12/2019 Urhahne ............ B62D 15/0285

(Continued)

FOREIGN PATENT DOCUMENTS

CN 115195703 A * 10/2022 ............ B60W 30/06
CN 115195704 A * 10/2022 ............ B60W 30/06

(Continued)

OTHER PUBLICATIONS

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (2 pages).

(Continued)

*Primary Examiner* — Atul Trivedi
(74) *Attorney, Agent, or Firm* — Crowell & Moring LLP

(57) ABSTRACT

A vehicle guidance system for the at least partially automated parking of a motor vehicle in a transverse parking space delimited by an initial object and an end object is designed to determine the length of the transverse parking space between the initial object and the end object. The vehicle guidance system is further designed to align the motor vehicle relative to the initial object or relative to the end object for a parking maneuver into the transverse parking space in the forward direction as a function of the determined length of the motor vehicle.

12 Claims, 3 Drawing Sheets

(58) Field of Classification Search
USPC .......................................................... 701/25
See application file for complete search history.

(56) References Cited

U.S. PATENT DOCUMENTS 11,396,240 B2 * 7/2022 Penilla .................. G05D 1/226
11,511,733 B2 * 11/2022 Niewiadomski ...... B60W 30/06
11,634,119 B2 * 4/2023 Hüger .................. G06V 20/586 340/932.2
11,691,619 B2 * 7/2023 Kim ...................... B60W 30/06 701/41
11,699,345 B2 * 7/2023 Dudar ................... B60W 30/06 340/932.2
12,252,172 B2 * 3/2025 Joseph .................. B60W 30/06
12,497,026 B2 * 12/2025 Zhang ................... B60W 30/06
2005/0285758 A1 * 12/2005 Matsukawa ............ G06V 10/25 340/932.2
2010/0274446 A1 * 10/2010 Sasajima ................ G08G 1/168 701/36
2011/0093168 A1 * 4/2011 Barth ................. B62D 15/0285 701/41
2015/0100193 A1 * 4/2015 Inagaki ................. B60W 30/06 701/23
2016/0075326 A1 * 3/2016 Kiyokawa ............. B60W 30/06 701/41
2018/0065665 A1 * 3/2018 Urhahne .............. G05D 1/0246
2018/0093664 A1 * 4/2018 Kim ...................... B60W 30/06
2018/0095474 A1 * 4/2018 Batur .................... G01S 13/867
2019/0329761 A1 * 10/2019 Kim ...................... B60W 30/06
2020/0070814 A1 * 3/2020 Park .................... B60W 40/105
2020/0086852 A1 * 3/2020 Krekel .................. B60W 50/14
2020/0279485 A1 * 9/2020 Zhang ................... G07F 17/246
2020/0294310 A1 * 9/2020 Lee ......................... G06T 17/30
2020/0317188 A1 * 10/2020 Lai ......................... G06V 20/58
2021/0009110 A1 * 1/2021 Jeong ................... G06V 20/584
2021/0056326 A1 * 2/2021 Kumar ................. G05D 1/0214
2021/0086758 A1 * 3/2021 Yamanaka ............ B60W 40/08
2021/0146915 A1 * 5/2021 Niewiadomski .......... G06T 7/13
2021/0179076 A1 * 6/2021 Nakada .................. G06V 20/58
2021/0272304 A1 * 9/2021 Yang .................... G06V 10/454
2022/0063598 A1 * 3/2022 Niewiadomski ... B62D 15/0285
2022/0097685 A1 * 3/2022 Von Eichhorn ....... B60W 60/00
2022/0250610 A1 * 8/2022 Gieseke ................ B60W 30/00
2023/0039125 A1 * 2/2023 Kunz .................... B60W 40/12
2023/0094446 A1 * 3/2023 Kamiyama ............ G06V 20/56 701/28
2025/0091569 A1 * 3/2025 Panthri ................. B60W 30/06
2025/0368188 A1 * 12/2025 Lal ........................ B60W 30/06

FOREIGN PATENT DOCUMENTS

CN 117373275 A * 1/2024 .............. G01S 5/011
DE 102011006629 A1 * 10/2012 ............ B60W 30/06
DE 10 2011 077 173 A1 12/2012
DE 102013019771 A1 * 5/2015 ......... B62D 15/0285
DE 10 2014 210 043 A1 10/2015
DE 102015116542 A1 * 3/2017 ............. G08G 1/147
DE 102016109851 A1 * 11/2017 ............. G08G 1/168
DE 102017114190 A1 * 12/2018 ............. G08G 1/162
DE 10 2019 005 997 A1 3/2020
DE 102020130669 A1 * 5/2021 ........... G06V 20/586
DE 102021112555 A1 * 12/2021 ........... B62D 15/028
DE 10 2020 117 770 A1 1/2022
DE 112021002072 T5 * 1/2023 ....... G08G 1/096827
DE 102023133201 A1 * 6/2024 ............ B60W 30/06
EP 3199428 A1 * 8/2017 ............. G08G 1/168
GB 2491720 A 12/2012
WO WO-2009078356 A1 * 6/2009 ............. G08G 1/165
WO WO-2009152977 A1 * 12/2009 ......... B62D 15/0285
WO WO-2013013871 A1 * 1/2013 ............ B60W 50/14
WO WO-2017093196 A1 * 6/2017 ............ B60W 50/14
WO WO-2021126090 A1 * 6/2021 ............ B60W 30/06
WO WO-2021161378 A1 * 8/2021 ............. G08G 1/168
WO WO-2025223200 A1 * 10/2025 ........ B60W 30/0956

OTHER PUBLICATIONS

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

International Search Report (PCT/ISA/210) issued in PCT Application No. PCT/EP2023/054073 dated May 31, 2023 with English translation (5 pages).

German-language Written Opinion (PCT/ISA/237) issued in PCT Application No. PCT/EP2023/054073 dated May 31, 2023 with English translation (9 pages).

German-language Search Report issued in German Application No. 10 2022 104 437.8 dated Sep. 23, 2022 with partial English translation (11 pages).

* cited by examiner

METHOD AND VEHICLE GUIDANCE SYSTEM FOR PARKING A VEHICLE IN A TRANSVERSE PARKING SPACE

BACKGROUND AND SUMMARY

The invention relates to a method and to a corresponding vehicle guidance system for the automated parking of a vehicle in a transverse parking space.

A vehicle may have a vehicle guidance system that supports the driver of the vehicle to guide the vehicle into a parking space in an at least partially or fully automated manner. The longitudinal and/or transverse guidance of the vehicle during the parking maneuver may be effected in an at least partially or fully automated manner by the vehicle guidance system.

The present document concerns the technical problem of increasing the convenience and efficiency of an automated parking maneuver into a transverse parking space.

The object is achieved by each individual instance of the independent claims. Advantageous embodiments are described in the dependent claims, inter alia. It is pointed out that additional features of a patent claim dependent on an independent patent claim can form a separate invention, independent of the combination of all the features of the independent patent claim, that can be turned into the subject matter of an independent claim, a divisional application or a subsequent application without the features of the independent patent claim or only in combination with a subset of the features of the independent patent claim. This applies in the same manner to technical teachings described in the description that are able to form an invention independent of the features of the independent patent claims.

According to one aspect, a vehicle guidance system for the at least partially automated parking of a motor vehicle in a transverse parking space that is delimited (on one side) by an initial object and (on the other side) an end object is described. The transverse parking space may be arranged laterally alongside the motor vehicle, with the motor vehicle moving in a particular direction of travel on a road. The parking may be performed transverse to the direction of travel of the motor vehicle. The particular direction of travel of the motor vehicle may proceed along the transverse parking space from the initial object in the direction towards the end object. The initial object may be the object that delimits the transverse parking space and that is first passed by the motor vehicle. The end object may be the object that delimits the transverse parking space that is arranged behind the initial object in the direction of travel of the motor vehicle (and that may be passed second by the motor vehicle).

For a parking maneuver in the forward direction, the motor vehicle may first drive past the transverse parking space and may then move the rear of the motor vehicle away from the transverse parking space in reverse travel in order to arrange the front of the motor vehicle in front of the transverse parking space. In a second move, the motor vehicle may then be driven in the forward direction into the transverse parking space. For a parking maneuver in the reverse direction, the motor vehicle may first drive past the transverse parking space and may then move the rear of the motor vehicle towards the transverse parking space in reverse travel. It may be necessary, where appropriate, for the motor vehicle to be moved away from the transverse parking space in the forward direction in a subsequent correcting move in order to align the motor vehicle relative to the transverse parking space. The motor vehicle may then reverse park in the transverse parking space in an additional reverse travel.

The initial object and/or the end object may each be a different vehicle that is parked in a parking lot (typically in the transverse direction). As an alternative or in addition, the initial object and/or the end object may be a line and/or ground marking (running in the transverse direction). The parking space for the motor vehicle may be arranged between the two objects. In particular, the parking space may be delimited by the two objects (along the direction of travel of the motor vehicle).

The vehicle guidance system may be set up to capture surroundings data in relation to the surroundings of the vehicle using one or more surroundings sensors (for example using one or more ultrasonic sensors, using one or more cameras, using one or more radar sensors, using one or more lidar sensors, etc.) of the motor vehicle while the motor vehicle travels on the road along the particular direction of travel past the initial object of the transverse parking space toward the end object. It may therefore be that the initial object is passed first (along the direction of travel) and the end object may then also possibly still be passed. In this case, the motor vehicle may be subject to, possibly manual, longitudinal and/or transverse guidance on the road by the driver.

The vehicle guidance system may be set up to detect the transverse parking space on the basis of the surroundings data. The vehicle guidance system may furthermore be set up to determine the length of the transverse parking space along the direction of travel on the basis of the surroundings data. The parking maneuver in the transverse parking space may then be performed transverse to the direction of travel of the motor vehicle, for example such that (at the end of the parking maneuver) the transverse axis of the motor vehicle runs substantially parallel to the direction of the length of the transverse parking space.

The vehicle guidance system may be set up to determine a user input of a user (in particular the driver) of the motor vehicle. The user input may in this case at a user interface of the motor vehicle. The user input may be used as a basis for identifying the fact that a parking maneuver into the detected transverse parking space is intended to be performed. Furthermore, the vehicle guidance system may be set up to use the user input as a basis for determining the parking direction (that is to say forward or reverse) for the at least partially automated parking of the motor vehicle in the transverse parking space.

The vehicle guidance system is set up to align the motor vehicle relative to the initial object for a parking maneuver into the transverse parking space in the forward direction. In this case, the motor vehicle may be positioned in the transverse parking space at a predefined lateral distance alongside the initial object (for example so that the motor vehicle is relatively close alongside the initial object and relatively far away from the end object in the transverse parking space). The motor vehicle may therefore be parked closer to the initial object than to the end object. The motor vehicle may also be aligned in the transverse parking space depending on the alignment of the initial object (for example so that the motor vehicle is arranged parallel to the initial object).

For a parking maneuver in the forward direction, the position and/or positioning and/or the alignment of the end object may be disregarded during the at least partially automated parking of the motor vehicle in the transverse parking space. In particular, the end object may be disregarded during the at least partially automated parking of the motor vehicle in the transverse parking space.

The vehicle guidance system is also set up to align the motor vehicle relative to the end object for a parking maneuver into the transverse parking space in the reverse direction. In this case, the motor vehicle may be positioned in the transverse parking space at a predefined lateral distance alongside the end object (for example so that the motor vehicle is relatively close alongside the end object and relatively far away from the initial object in the transverse parking space). The motor vehicle may therefore be parked closer to the end object than to the initial object. The motor vehicle may also be aligned in the transverse parking space depending on the alignment of the end object (for example so that the motor vehicle is arranged parallel to the end object).

For a parking maneuver in the reverse direction, the position and/or positioning and/or the alignment of the initial object may be disregarded during the at least partially automated parking of the motor vehicle in the transverse parking space. In particular, the initial object may be disregarded during the at least partially automated parking of the motor vehicle in the transverse parking space.

It is therefore possible to selectively (and mutually exclusively) align the motor vehicle either relative to the initial object or relative to the end object depending on the parking direction during the at least partially automated parking of the motor vehicle in the transverse parking space. The convenience and the efficiency of the driver assistance system can thus be increased.

As already illustrated further above, the vehicle guidance system may be set up to determine the length of the transverse parking space between the initial object and the end object. It is then possible to determine, depending on the determined length, whether or not the motor vehicle has been aligned selectively either relative to the initial object or relative to the end object depending on the parking direction during the at least partially automated parking of the motor vehicle in the transverse parking space.

The vehicle guidance system may be set up, in particular, to selectively align the motor vehicle either relative to the initial object or relative to the end object depending on the parking direction during the at least partially automated parking of the motor vehicle in the transverse parking space (possibly only) if it is determined that the length is greater than a first length threshold value and (equal to or) smaller than a second length threshold value. In this case, the second length threshold value is greater than the first length threshold value. The first length threshold value may be, for example, between 3 and 4 meters. The second length threshold value may be, for example, between 6 and 8 meters.

Restricting the direction-dependent alignment of the motor vehicle to transverse parking spaces with an average length can further increase the convenience and the efficiency of the vehicle guidance system.

The vehicle guidance system may be set up to align the motor vehicle relative to the initial object and relative to the end object, in particular to position the motor vehicle centrally in the transverse parking space between the initial object and the end object, during the at least partially automated parking of the motor vehicle in the transverse parking space irrespective of the parking direction if it is determined that the length is (equal to or) smaller than the first length threshold value. In the case of parking spaces with a relatively short length, it is thus possible to align the motor vehicle centrally in order to further increase the convenience and the efficiency of the vehicle guidance system.

The vehicle guidance system may be set up to align the motor vehicle relative to the end object during the at least partially automated parking of the motor vehicle in the transverse parking space irrespective of the parking direction if it is determined that the length is greater than the second length threshold value. In the case of parking spaces with a relatively great length, it is thus possible to always align the motor vehicle with the end object in order to further increase the convenience and the efficiency of the vehicle guidance system, in particular if the motor vehicle has to drive as far as the end object to capture the transverse parking space (for example if the transverse parking space is identified (possibly solely) on the basis of one or more ultrasonic sensors of the motor vehicle).

The vehicle guidance system may possibly be designed in such a way that the automated parking maneuver can be performed even if the motor vehicle has not driven as far as the end object (and is therefore on the road between the initial object and the end object in the direction of travel). This may be the case, for example, if a camera and/or a lidar sensor are used to identify the transverse parking space.

The vehicle guidance system may be set up (in particular in the aforementioned case) to determine the distance between the motor vehicle and the initial object along the direction of travel of the motor vehicle (after the motor vehicle has driven past the initial object). It is then possible to determine, depending on the determined distance, whether or not the motor vehicle is aligned selectively either relative to the initial object or relative to the end object depending on the parking direction during the at least partially automated parking of the motor vehicle in the transverse parking space. For example, it is possible to determine that the selective alignment is taking place on the basis of the parking direction if the distance is smaller than (or equal to) a particular distance threshold value (for example between 6 and 8 meters). The convenience and the efficiency of the vehicle guidance system can thus be further increased.

According to another aspect, a vehicle guidance system for the at least partially automated parking of a motor vehicle in a transverse parking space that is delimited by an initial object and by an end object is described. The aspects described in this document can also be applied to this vehicle guidance system individually or in combination.

The vehicle guidance system is set up to determine the length of the transverse parking space between the initial object and the end object. The vehicle guidance system is furthermore set up to align the motor vehicle (either) relative to the initial object or relative to the end object depending on the determined length for a parking maneuver into the transverse parking space in the forward direction. In this case, the motor vehicle may be aligned relative to the end object if the length is greater than a length threshold value (in particular greater than the second length threshold value). On the other hand, the motor vehicle may be aligned relative to the initial object if the length is smaller than the length threshold value (in particular smaller than the second length threshold value). The convenience and the efficiency of the vehicle guidance system can thus be increased.

The vehicle guidance system may also be set up to align the motor vehicle relative to the end object for a parking maneuver into the transverse parking space in the reverse direction (possibly irrespective of the length of the transverse parking space).

The vehicle guidance system may therefore be set up to compare the determined length with at least one length threshold value (in particular for a parking maneuver into the transverse parking space in the forward direction). The vehicle guidance system may be set up, in particular, to compare the determined length with a first length threshold value and with a second length threshold value, wherein the second length threshold value is greater than the first length threshold value. It is then possible to select a particular parking direction (for example forward direction or reverse direction) and/or to align the motor vehicle (either) relative to the initial object or relative to the end object for the parking maneuver into the transverse parking space depending on the comparison.

As already illustrated further above, the vehicle guidance system may be set up to selectively align the motor vehicle either relative to the initial object or relative to the end object during the at least partially automated parking of the motor vehicle in the transverse parking space depending on the parking direction if it is determined that the length is greater than the first length threshold value and smaller than the second length threshold value. In this case, the motor vehicle may be aligned relative to the initial object for a parking maneuver into the transverse parking space in the forward direction. On the other hand, the motor vehicle may be aligned relative to the end object for a parking maneuver into the transverse parking space in the reverse direction.

The vehicle guidance system may be set up to align the motor vehicle relative to the initial object and relative to the end object, in particular to position the motor vehicle centrally in the transverse parking space between the initial object and the end object, during the at least partially automated parking of the motor vehicle in the transverse parking space irrespective of the parking direction if it is determined that the length is smaller than the first length threshold value.

The vehicle guidance system may also be set up to align the motor vehicle relative to the end object during the at least partially automated parking of the motor vehicle in the transverse parking space irrespective of the parking direction if it is determined that the length is greater than the second length threshold value.

The vehicle guidance system may thus be set up to determine, depending on the determined length, whether the motor vehicle is aligned (possibly selectively) relative to the initial object or relative to the end object depending on the parking direction during the at least partially automated parking of the motor vehicle in the transverse parking space.

As already illustrated further above, the vehicle guidance system may be set up to position the motor vehicle in the transverse parking space at a predefined lateral distance alongside the initial object and/or to align the motor vehicle in the transverse parking space depending on the alignment of the initial object in order to align the motor vehicle relative to the initial object for the parking maneuver into the transverse parking space. On the other hand, the position and/or alignment of the end object may be disregarded during the at least partially automated parking of the motor vehicle in the transverse parking space if the motor vehicle is aligned relative to the initial object for the parking maneuver into the transverse parking space.

In a corresponding manner, the vehicle guidance system may be set up to position the motor vehicle in the transverse parking space at a predefined lateral distance alongside the end object and/or to align the motor vehicle in the transverse parking space depending on the alignment of the end object in order to align the motor vehicle relative to the end object for the parking maneuver into the transverse parking space. On the other hand, the position and/or alignment of the initial object may be disregarded during the at least partially automated parking of the motor vehicle in the transverse parking space if the motor vehicle is aligned relative to the end object for the parking maneuver into the transverse parking space.

According to another aspect, a (road) motor vehicle (in particular an automobile or a commercial vehicle or a bus) comprising one of the vehicle guidance systems described in this document is described.

According to another aspect, a method for the at least partially automated parking of a motor vehicle in a transverse parking space is described. In this case, the transverse parking space is delimited by an initial object and an end object (along the direction of travel of the motor vehicle).

The method comprises determining (for example on the basis of a user input) whether the motor vehicle is intended to be parked in the transverse parking space in the forward direction or in the reverse direction. The method furthermore comprises aligning the motor vehicle relative to the initial object (and not relative to the end object) for a parking maneuver in the forward direction and relative to the end object (and not relative to the initial object) for a parking maneuver in the reverse direction.

According to another aspect, a method for the at least partially automated parking of a motor vehicle in a transverse parking space that is delimited by an initial object and by an end object is described. The aspects described in this document can also be applied to this method individually or in combination. The method comprises determining the length of the transverse parking space between the initial object and the end object. The method furthermore comprises aligning the motor vehicle (either) relative to the initial object or relative to the end object for a parking maneuver into the transverse parking space in the forward direction depending on the determined length.

According to another aspect, a software (SW) program is described. The SW program may be set up to be executed on a processor (for example on a control unit of a vehicle) and thereby to execute one of the methods described in this document.

According to another aspect, a storage medium is described. The storage medium may comprise an SW program that is set up to be executed on a processor and thereby to execute one of the methods described in this document.

In the context of the document, the term "automated driving" can be understood as meaning driving with automated longitudinal or transverse guidance or autonomous driving with automated longitudinal and transverse guidance. Automated driving may involve, for example, driving for a relatively long time on the freeway or driving for a limited time in the context of parking or maneuvering. The term "automated driving" comprises automated driving with any desired degree of automation. Exemplary degrees of automation are assisted, partially automated, highly automated or fully automated driving. These degrees of automation were defined by the BASt (Bundesanstalt für Straßenwesen—Federal Highway Research Institute) (see BASt publication "Forschung kompakt", November 2012 edition). During assisted driving, the driver permanently carries out the longitudinal or transverse guidance, while the system performs the respective other function within certain limits. During partially automated driving, the system performs the longitudinal and transverse guidance for a certain period and/or in specific situations, in which case the driver must permanently monitor the system, like during assisted driving. During highly automated driving, the system performs the longitudinal and transverse guidance for a certain period without the driver having to permanently monitor the system; however, the driver must be able to assume the vehicle guidance in a certain time. During fully automated driving, the system can automatically manage driving in all situations for a specific application; a driver is no longer required for this application. The four aforementioned degrees of automation correspond to SAE levels 1 to 4 of the standard SAE J3016 (SAE—Society of Automotive Engineering). For example, highly automated driving corresponds to level 3 of the standard SAE J3016. SAE level 5 is also provided in SAE J3016 as the highest degree of automation but is not included in the definition by the BASt. SAE level 5 corresponds to driverless driving, in which the system can automatically manage all situations like a human driver during the entire journey; a driver is generally no longer required. It should be noted that the methods, devices and systems described in this document may be used both on their own and in combination with other methods, devices and systems described in this document. Moreover, any aspects of the methods, devices and systems described in this document may be combined with one another in a wide variety of ways. In particular, the features of the claims may be combined with one another in a wide variety of ways. Features introduced in parentheses should also be understood as being optional features. The vehicle guidance system described in this document may be designed, for example, in accordance with SAE level 2 or SAE level 3.

The invention is described in more detail below with reference to exemplary embodiments.

DETAILED DESCRIPTION OF THE DRAWINGS

Figure 1:
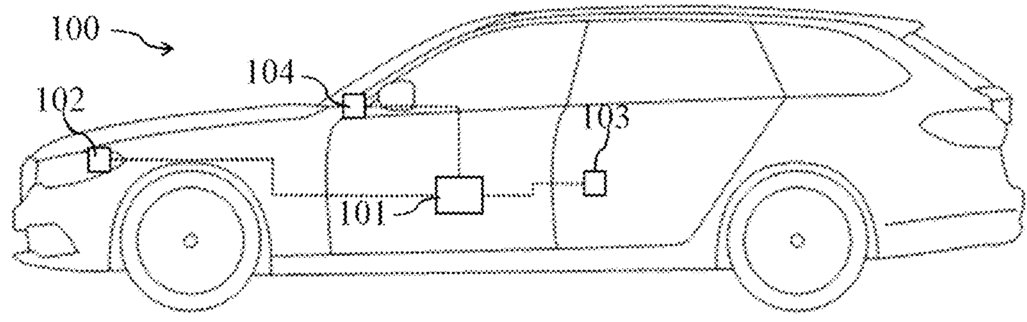
FIG. 1 shows an exemplary vehicle having a vehicle guidance system for performing automated parking maneuvers.

As illustrated at the outset, the present document is concerned with increasing the convenience and the efficiency of an automated parking maneuver into a transverse parking space. In this context, FIG. 1 shows an exemplary (motor) vehicle 100 comprising one or more surroundings sensors 102 (for example a camera, a lidar sensor, a radar sensor, an ultrasonic sensor, etc.), each of which are set up to capture surroundings data (that is to say sensor data) in relation to the surroundings of the vehicle 100. A (control) device 101 of the vehicle 100 may be set up to evaluate the surroundings data from the one or more surroundings sensors 102 in order to identify one or more objects and/or a parking space in the surroundings of the vehicle 100. In particular, it is possible to use the surroundings data as a basis for detecting a transverse parking space that is delimited by two objects.

The vehicle 100 also comprises one or more longitudinal and/or transverse guidance actuators 103 (for example a drive motor, a steering device and/or a braking device) that are set up to subject the vehicle 100 to automatic longitudinal and/or transverse guidance. The device 101 may be set up to operate the one or more actuators 103 depending on the surroundings data in order to park the vehicle 100 in an identified transverse parking space in an at least partially automated manner. In this case, in particular, the transverse guidance can be effected by the vehicle 100 in an automated manner. Where appropriate, it may also be necessary for the longitudinal guidance to be effected manually by the driver of the vehicle 100 during the parking maneuver.

Figure 2A:
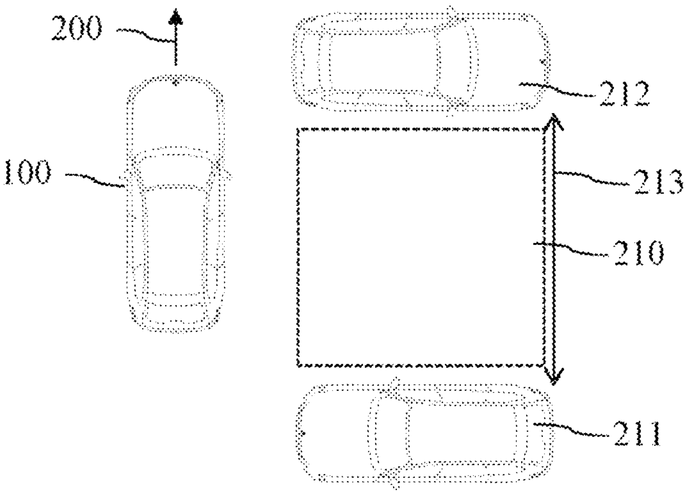
FIGS. 2*a* to 2*c* show exemplary parking maneuvers into a transverse parking space.
Figure 2B:
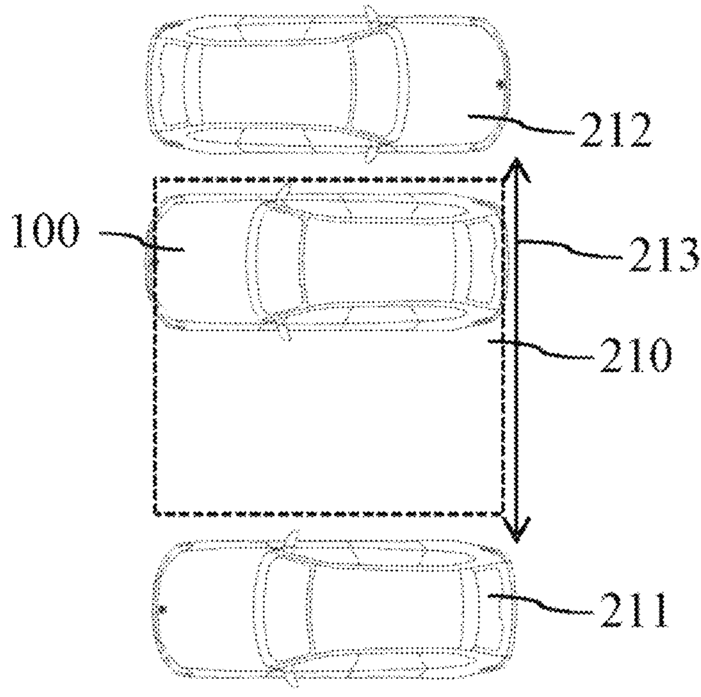
Figure 2C:
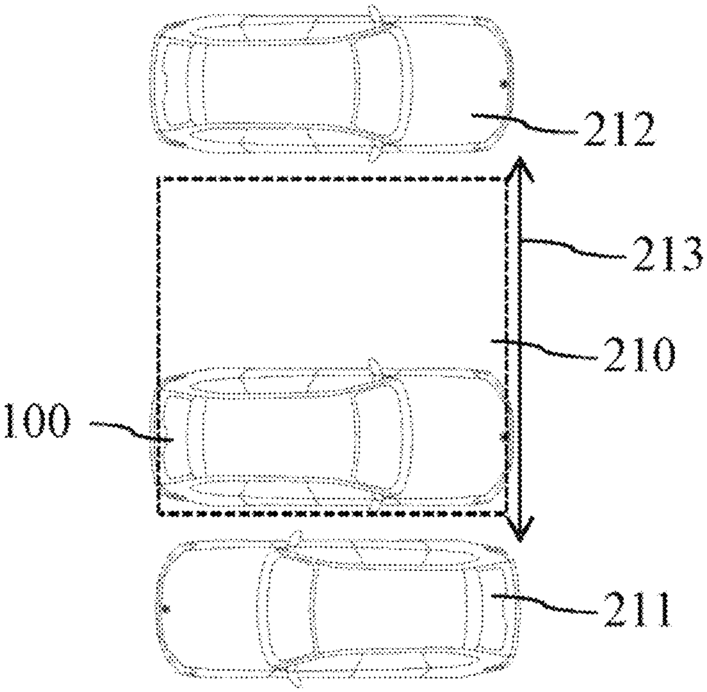

FIGS. 2*a* to 2*c* show exemplary parking maneuvers in a transverse parking space. FIG. 2*a* illustrates how the vehicle 100 drives on a road in the (forward) direction of travel 200, illustrated by the arrow, past a transverse parking space 210 between two objects 211, 212, in particular between an initial object 211 and an end object 212. The transverse parking space 210 can be detected on the basis of the surroundings data from the one or more surroundings sensors 102 of the vehicle 100. The length 213 of the transverse parking space 210 from the initial object 211 up to the end object 212 can also be determined on the basis of the surroundings data.

The initial object 211 of the identified transverse parking space 210 is the delimiting object that is passed (or would be passed) first by the vehicle 100 when traveling in the (forward) direction of travel 200. The end object 212 of the identified transverse parking space 210 is the delimiting object that is passed (or would be passed) last by the vehicle 100 when traveling in the (forward) direction of travel 200.

The vehicle 100 may comprise a user interface 104 via which it is possible to communicate to the driver of the vehicle 100 that a transverse parking space 210 has been identified alongside the vehicle 100. It is also possible, where appropriate, to output information in relation to the size (in particular in relation to the length 213) of the parking space 210.

A user input of the driver can be detected via the user interface 104 to the effect of whether or not an at least partially automated parking maneuver into the detected transverse parking space 210 is to be performed. The driver can also be enabled to select via the user interface 104 whether the parking maneuver into the transverse parking space 210 is to be performed in the forward direction (that is to say with the front first) or in the reverse direction (that is to say with the rear first).

The device 101 (that is to say the vehicle guidance system) may be set up to use the end object 212 as a reference for the parking maneuver if the vehicle 100 is to be parked in the transverse parking space 210 in the reverse direction. It is then possible to effect the vehicle 100 being placed closer to the end object 212 than to the initial object 211. In particular, it is possible to cause the vehicle 100 to be at a defined lateral distance from the end object 212 (that is typically significantly smaller than the (undefined) distance from the initial object 211). It is also possible, where appropriate, to adjust the alignment of the vehicle 100 within the transverse parking space 210 to the alignment of the end object 212, for example in order to cause the vehicle 100 to be parallel to the end object 212 in the transverse parking space 210. The final state of a parking maneuver in the reverse direction is illustrated by way of example in FIG. 2*b*.

On the other hand, the device 101 (that is to say the vehicle guidance system) may be set up to use the initial object 211 as a reference for the parking maneuver if the vehicle 100 is to be parked in the transverse parking space 210 in the forward direction. It is then possible to cause the vehicle 100 to be placed closer to the initial object 211 than to the end object 212. In particular, it is possible to cause the vehicle 100 to be at a defined lateral distance from the initial object 211 (that is typically significantly smaller than the (undefined) distance from the end object 212). It is also possible, where appropriate, to adjust the alignment of the vehicle 100 within the transverse parking space 210 to the alignment of the initial object 211, for example in order to cause the vehicle 100 to be parallel to the initial object 211 in the transverse parking space 210. The final state of a parking maneuver in the forward direction is illustrated by way of example in FIG. 2*c*.

The direction-dependent selection of the initial object 211 or the end object 212 as the reference object for the automated parking process can increase the convenience and efficiency of the parking maneuver. In particular, the number of correcting moves and the distance covered for the parking maneuver can be reduced as a result.

The device 101 (that is to say the vehicle guidance system) may be set up to adjust the automated parking maneuver depending on the determined length 213 of the transverse parking space 210. In this case, the length 213 runs substantially parallel to the direction of travel 200 of the vehicle 100 before the automated parking maneuver into the transverse parking space 210 is initiated.

The device 101 may be set up to determine that the length 213 is sufficiently large for a parking maneuver but is equal to or smaller than (for example ≤ or <) a first length threshold value (for example 3.9 meters). In this case, the initial object 211 and the end object 212 can be used as reference objects (irrespective of the parking direction) in order to position the vehicle 100 in the transverse parking space 210 in an automated manner. In this case, the vehicle 100 may be positioned substantially centrally between the initial object 211 and the end object 212.

The device 101 may be set up to determine that the length 213 is greater than the first length threshold value and smaller than or equal to (for example ≤ or <) a second length threshold value (for example 6.5 meters). In this case, the reference object may be selected depending on the parking direction, as illustrated in connection with FIGS. 2*b* and 2*c*.

The device 101 may furthermore be set up to determine that the length 213 is greater than the second length threshold value. In this case, the end object 212 can be used as a reference object (irrespective of the parking direction) in order to position the vehicle 100 in the transverse parking space 210 in an automated manner. In this case, the vehicle 100 may be positioned at a particular predefined lateral distance relative to the end object 212. It is thus possible to reliably prevent the vehicle 100 from having to be driven over a relatively long distance back to the initial object 211 in order to align the vehicle 100 with the initial object 211 (for a parking maneuver in the forward direction). Limiting the parking-direction-dependent selection of the reference object to transverse parking spaces 210 with a length 213 between the first length threshold value and the second length threshold value can further increase the convenience and the efficiency of the vehicle guidance system.

In order to reduce the number of moves and to configure the trajectory for an automated parking maneuver as intuitively as possible, it is therefore possible to align the vehicle 100 with the initial object 211 in the case of relatively large transverse parking spaces 210 (with a length 213 between the first length threshold value and the second length threshold value) if a parking maneuver is intended to be effected in the forward direction. On the other hand, if the transverse parking space 210 is too large (for example with a length 213 of more than the second length threshold value) to be perceived by the driver as a transverse parking space 210, the vehicle 100 may also be aligned with the end object 212 during a parking maneuver in the forward direction.

Figure 3:
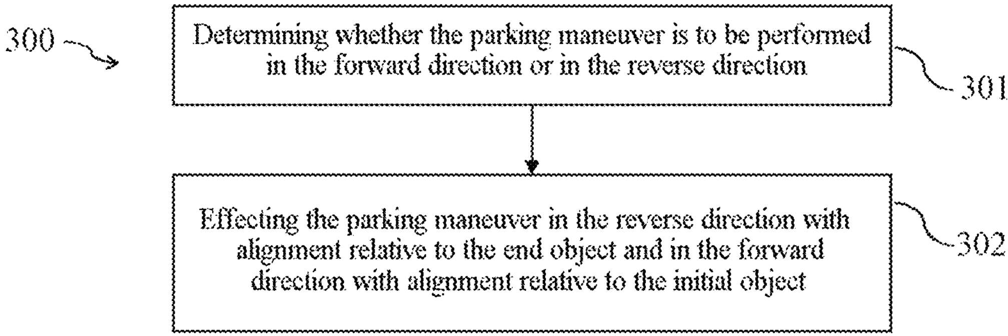
FIG. 3 shows a flowchart of an exemplary method for the automated performance of a parking maneuver into a transverse parking space.

FIG. 3 shows a flowchart of an exemplary (possibly computer-implemented) method 300 for the at least partially automated parking of a motor vehicle 100 in a transverse parking space 210 that is delimited (on a first side) by an initial object 211 and (on the opposite second side) by an end object 212. Between the initial object 211 and the end object 212 there is an area in which the motor vehicle 100 can park in the transverse direction (that is to say transverse to the current direction of travel 200 of the vehicle 100). The parking can be effected here with automated longitudinal and/or transverse guidance.

The method 300 comprises determining 301 whether the motor vehicle 100 is to be parked in the transverse parking space 210 in the forward direction (that is to say with the front first) or in the reverse direction (that is to say with the rear first). This may be determined on the basis of a user input.

The method 300 further comprises aligning 302 the motor vehicle 100 relative to the initial object 211 (and not relative to and/or irrespective of the end object 212) for a parking maneuver in the forward direction and relative to the end object (and not relative to and/or irrespective of the initial object 211) for a parking maneuver in the reverse direction.

The measures described in this document can be used to increase the convenience and the efficiency of a vehicle guidance system for automated parking.

The present invention is not restricted to the exemplary embodiments shown. It should be noted in particular that the description and the figures are intended to illustrate the principle of the proposed methods, devices and systems only by way of example.

The invention claimed is:

1. A vehicle guidance system for the at least partially automated parking of a motor vehicle in a transverse parking space delimited by an initial object and an end object, the vehicle guidance system comprising:
- one or more sensors configured to sense the transverse parking space, the initial object, and the end object; and
- a control device configured to:
  - determine a length of the transverse parking space between the initial object and the end object,
  - select one of: the initial object and the end object, as a reference for a forward-transverse parking maneuver, wherein the selection is based on the determined length, and
  - align the motor vehicle relative to the selected one of: the initial object and the end object, in order to execute the forward-transverse parking maneuver.

2. The vehicle guidance system of claim 1, wherein the control device is further configured to, for the forward-transverse parking maneuver:
- compare the determined length with a length threshold value,
- align the motor vehicle relative to the end object when the length is greater than the length threshold value, and
- align the motor vehicle relative to the initial object when the length is smaller than the length threshold value.

3. The vehicle guidance system of claim 1, wherein the control unit is further configured to:
- determine from the determined length, whether the motor vehicle is aligned selectively either relative to the initial object or relative to the end object depending on a parking direction during the at least partially automated parking of the motor vehicle in the transverse parking space.

4. The vehicle guidance system of claim 1, wherein the control unit is further configured to:

compare the determined length with a first length threshold value and with a second length threshold value, wherein the second length threshold value is greater than the first length threshold value; and effect a parking direction and/or an alignment of the motor vehicle relative to the initial object or relative to the end object for the parking maneuver into the transverse parking space depending on the comparison.

5. The vehicle guidance system of claim 4, wherein the control unit is further configured to:

selectively align the motor vehicle either relative to the initial object or relative to the end object depending on the parking direction during the at least partially automated parking of the motor vehicle in the transverse parking space when it is determined that the length is greater than the first length threshold value and smaller than the second length threshold value.

6. The vehicle guidance system of claim 4, wherein the control unit is further configured to:

position the motor vehicle centrally in the transverse parking space between the initial object and the end object, during the at least partially automated parking of the motor vehicle in the transverse parking space, irrespective of the parking direction when it is determined that the length is smaller than the first length threshold value.

7. The vehicle guidance system of claim 4, wherein the control unit is configured to:

align the motor vehicle relative to the end object during the at least partially automated parking of the motor vehicle in the transverse parking space irrespective of the parking direction when it is determined that the length is greater than the second length threshold value.

8. The vehicle guidance system of claim 1, wherein the one or more sensors are further configured to:

capture surroundings data in relation to the surroundings of the vehicle while the motor vehicle travels along a direction of travel past the initial object of the transverse parking space along the transverse parking space in the direction toward the end object, and wherein the control unit is further configured to:

detect the transverse parking space from the surroundings data, and determine the length of the transverse parking space along the direction of travel from the surroundings data.

9. The vehicle guidance system of claim 1, wherein the control unit is further configured to:

determine a user input of a user of the motor vehicle a user interface; and determine a parking direction for the at least partially automated parking of the motor vehicle in the transverse parking space on the basis of the user input.

10. The vehicle guidance system of claim 1, wherein the control unit is further configured to:

position the motor vehicle in the transverse parking space at a predefined lateral distance alongside the initial object, and/or align the motor vehicle in the transverse parking space depending on an alignment of the initial object, so as to:

align the motor vehicle relative to the initial object for the parking maneuver into the transverse parking space, or position the motor vehicle in the transverse parking space at a predefined lateral distance alongside the end object, and/or align the motor vehicle in the transverse parking space depending on an alignment of the end object, so as to align the motor vehicle relative to the end object for the parking maneuver into the transverse parking space.

11. The vehicle guidance system of claim 1, wherein the control unit is further configured to:

disregard a position and/or alignment of the end object during the at least partially automated parking of the motor vehicle in the transverse parking space when the motor vehicle is aligned relative to the initial object for the parking maneuver into the transverse parking space, and disregard a position and/or alignment of the initial object during the at least partially automated parking of the motor vehicle in the transverse parking space when the motor vehicle is aligned relative to the end object for the parking maneuver into the transverse parking space.

12. A method for the at least partially automated parking of a motor vehicle in a transverse parking space that is delimited by an initial object and an end object, the method comprising:

determining a length of the transverse parking space between the initial object and the end object;

selecting one of: the initial object and the end object, as a reference for a forward-transverse parking maneuver, wherein the selection is based on the determined length; and aligning the motor vehicle relative to the selected one of: the initial object and the end object, in order to execute the forward-transverse parking maneuver into the transverse parking space.

* * * * *